(12) United States Patent
Hassani et al.

(10) Patent No.: US 11,954,253 B2
(45) Date of Patent: Apr. 9, 2024

(54) ANALOG DRIVING FEATURE CONTROL BRAIN MACHINE INTERFACE

(71) Applicant: Ford Global Technologies, LLC, Dearborn, MI (US)

(72) Inventors: Ali Hassani, Ann Arbor, MI (US); Aniruddh Ravindran, Sunnyvale, CA (US); Dimitar Filev, Novi, MI (US); Vijay Nagasamy, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 16/993,083

(22) Filed: Aug. 13, 2020

(65) Prior Publication Data
US 2022/0050524 A1 Feb. 17, 2022

(51) Int. Cl.
| | |
|---|---|
| *G06F 3/01* | (2006.01) |
| *B60W 10/18* | (2012.01) |
| *B60W 10/20* | (2006.01) |
| *B60W 40/08* | (2012.01) |
| *B60W 50/10* | (2012.01) |
| *G06N 7/02* | (2006.01) |

(52) U.S. Cl.
CPC ............. *G06F 3/015* (2013.01); *B60W 10/18* (2013.01); *B60W 10/20* (2013.01); *B60W 40/08* (2013.01); *B60W 50/10* (2013.01); *G06N 7/02* (2013.01); *B60W 2540/22* (2013.01)

(58) Field of Classification Search
CPC ....... G06F 3/015; B60W 10/18; B60W 10/20; B60W 40/08; B60W 50/10; B60W 2540/22; B60W 2540/221; B60W 50/08; G06N 7/02; G06N 3/08; G06N 20/10; B60R 16/0231
See application file for complete search history.

(56) References Cited

U.S. PATENT DOCUMENTS

| | | | | |
|---|---|---|---|---|
| 2016/0325758 | A1* | 11/2016 | Huang | ................... B62D 1/286 |
| 2021/0124419 | A1* | 4/2021 | Kang | ................... B60W 50/10 |

FOREIGN PATENT DOCUMENTS

| | | |
|---|---|---|
| CN | 104133470 A | 11/2014 |
| KR | 101632830 B1 | 6/2016 |

OTHER PUBLICATIONS

"Nissan wants to read your brain waves in order to help prevent auto accidents," Leif Johnson, Jan. 3, 2018, TechRadar (10 pages).

* cited by examiner

*Primary Examiner* — Alan D Hutchinson
(74) *Attorney, Agent, or Firm* — Frank Lollo; Eversheds Sutherland (US) LLP (57) ABSTRACT

Embodiments describe a system configured with a brain machine interface (BMI) system implemented in a vehicle for performing vehicle functions using electrical impulses from motor cortex activity in a user's brain. The system uses fuzzy states for increased robustness. The fuzzy states are defined by sets of Gaussian kernel-type membership functions that are defined for steering and velocity action function states. The membership functions define fuzzy states that provide overlapping control tiers for increasing and decreasing vehicle functionality. An autonomous vehicle may perform control and governance of transitions between membership functions that may overlap, resulting in smooth transitioning between the states.

20 Claims, 5 Drawing Sheets

ANALOG DRIVING FEATURE CONTROL BRAIN MACHINE INTERFACE

TECHNICAL FIELD

The present disclosure relates to brain-machine interfaces, and more particularly, to vehicle control with a brain machine interface.

BACKGROUND

Brain machine interface (BMI) is a technology that enables humans to provide commands to computers using human brain activity. BMI systems provide control input by interfacing an electrode array with the motor cortex region of the brain, and decoding received activity signals using a trained neural decoder that translates neuron firing patterns into discrete control commands.

BMI interfaces can include direct-contact electrode interface techniques that work with invasive direct contact to human brain motor cortex regions, and may also include non-invasive techniques where wireless receivers measure brain potential fields using electric field encephalography (EEG) receivers that may touch the scalp, temples, forehead, or other areas of the user's head externally. BMI systems generally work by sensing the potential fields, amplifying the data, and processing the received signals through a digital signal processor to associate neural activity patterns with functions that may control devices or provide some other type of output using the processed signals. Recent advancements in BMI technology have contemplated aspects of automotive vehicle control using BMIs.

A BMI system used to control a vehicle using electric field EEG is disclosed in Korean Patent Application Publication No. KR101632830 (hereafter "the '830 publication), which describes recognition of control bits obtained from an EEG apparatus for drive control of a vehicle. While the system described in the '830 publication may use some aspects of EEG data for vehicle signal control, the '830 publication does not disclose fuzzy state logic that can add reliability to control signals that can buffer unintended control commands.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosed systems and methods describe a BMI system implemented in a vehicle. In some embodiments, a user may exercise control over some driving functionality such as vehicle speed or direction control using the BMI system to read electrical impulses from the user's brain, decode the continuous neural data feed, and issue vehicle control commands in real time or substantially real time.

In one embodiment, the BMI system may include an EEG system configured to receive electric potential field signatures from the motor cortex of the user's brain using scalp-to-electrode external physical contacts that read the motor cortex signals. In other aspects, the electrodes may be disposed proximate the user's scalp without physical contact with the scalp surface, but within a relatively short operative range for signal collection and processing. In an embodiment, the brain-machine interface device may include a headrest in a vehicle configured to receive EEG signals.

In some embodiments, the BMI system may utilize control tiers associated with fuzzy states to exercise vehicle control using the BMI. The user may issue commands using thought signatures contained in the continuous neural data feed, and the BMI system may govern the state transitions while the user issues the thought commands.

For increased robustness, a BMI training system may group the control functions by fuzzy states. The fuzzy states may be mathematically defined by sets of Gaussian kernel-type membership functions that can provide overlapping control tiers for increasing and decreasing speed and turn angles (or radii), among other possible functionality. The membership functions are considered "fuzzy states" in that values associated with particular states may overlap with values in contiguous states, resulting in smooth transitioning between the states. The BMI training system may generate a correlation model that correlates the continuous neural data feed to the fuzzy state associated with the first vehicle control function, and integrate the correlation model into a BMI device configured onboard a vehicle.

In some embodiments, the trained brain machine interface (BMI) device onboard the vehicle may receive a continuous feed of neural data from the user. The vehicle may determine a user intention for a vehicle control instruction by an analysis of the continuous feed of neural data, and match the user intention to a fuzzy state associated with a vehicle control function. The vehicle may manage the state control by maintaining a current state until a subsequent state is received that comports with various driving characteristics defined in the autonomous vehicle control system.

The Vehicle Controls Unit may increment or decrement the fuzzy states based on inputs from the BMI that are based on the neural data feed indicating patterns associated with user intention. By incrementing a present state to a contiguous fuzzy state, the BMI may smoothly transition from state to state (e.g., from zero, to low, to medium to high etc.) based on the user's thought, translated into an intention, associated with a function, with which the system may generate a control command. In some aspects, the process may be governed by an autonomous vehicle controller to prevent inadvertent vehicle commands.

Embodiments of the present disclosure may provide for additional granularity of user control when interacting with an autonomous vehicle, where users may exercise some discrete control aspects that are ultimately governed by an autonomous vehicle controller. Embodiments of the present disclosure may provide for vehicle control for users with limited physical capabilities, and more generally, may provide convenience and robustness in BMI control systems.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
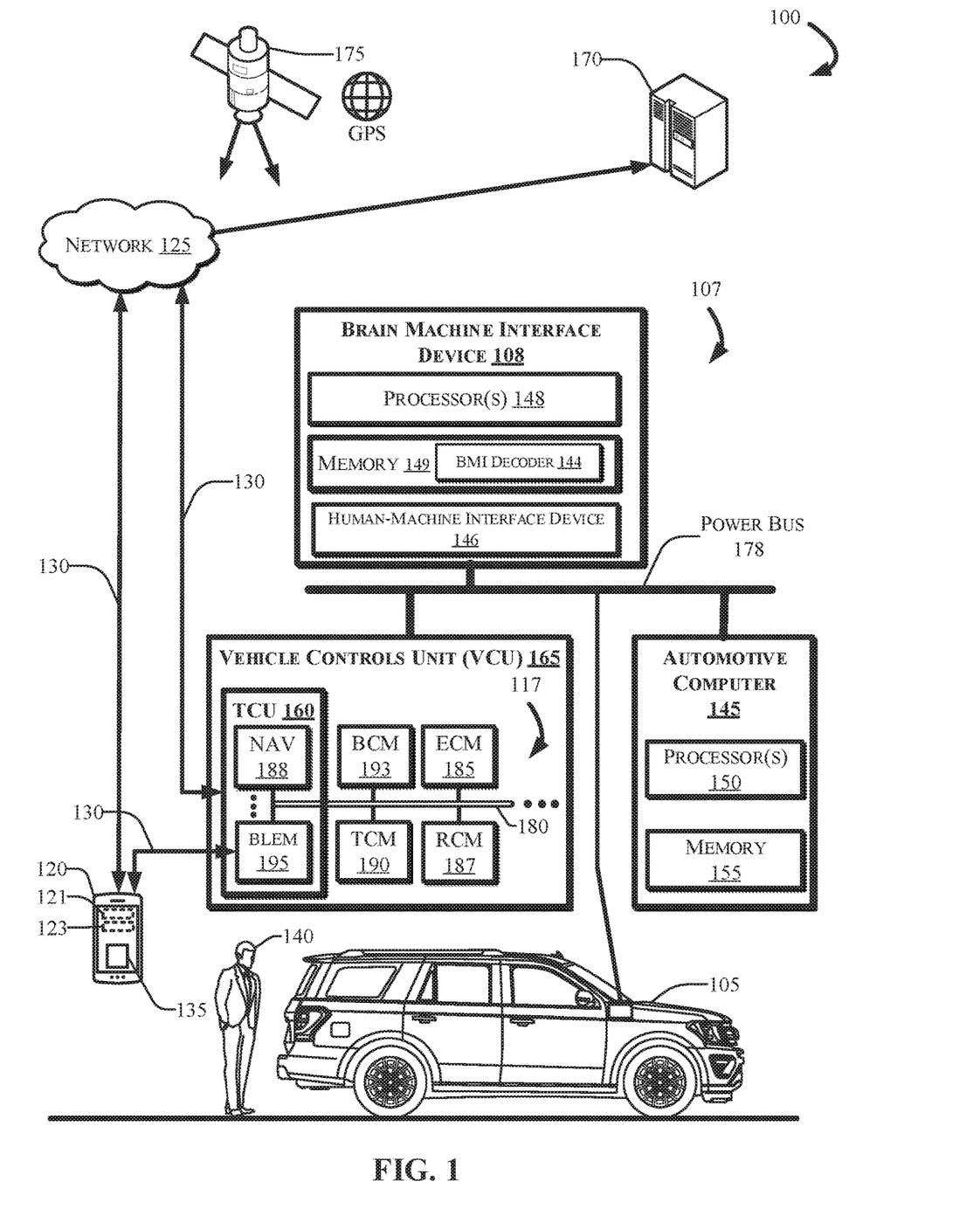
FIG. 1 depicts an example computing environment in which techniques and structures for providing the systems and methods disclosed herein may be implemented.

FIG. 1 depicts an example computing environment 100 that can include one or more vehicle(s) 105 comprising an automotive computer 145, and a Vehicle Controls Unit (VCU) 165 that typically includes a plurality of electronic control units (ECUs) 117 disposed in communication with the automotive computer 145 and a Brain Machine Interface (BMI) device 108. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Ultra-Wide Band (UWB), and other possible transmission techniques. The mobile device 120 generally includes a memory 123 for storing program instructions associated with an application 135 that, when executed by a mobile device processor 121, performs aspects of the present disclosure. The app 135 may be part of the BMI system 107, or may provide information to the BMI system 107 and/or receive information from the BMI system 107.

The automotive computer 145 generally refers to an electronic vehicle controller, which may include one or more processor(s) 150 and memory 155. The automotive computer 145 may, in some example embodiments, be disposed in communication with the mobile device 120, and one or more server(s) 170, which may be associated with and/or include a Telematics Service Delivery Network (SDN). The vehicle 105 may also receive and/or be in communication with a Global Positioning System (GPS) 175.

Although illustrated as a sport utility, the vehicle 105 may take the form of another passenger or commercial automobile such as, for example, a car, a truck, a sport utility, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that is configured to include an HEV powertrain connectable to an external power source. The vehicle 105 may be further configured to include a parallel or series hybrid powertrain having a combustion engine powerplant and one or more EV drive systems that can include battery power storage, supercapacitors, flywheel power storage systems, and other types of power storage and generation. In other aspects, the vehicle 105 may be configured as a fuel cell vehicle (FCV) where the vehicle 105 is powered by a fuel cell, a hydrogen FCV, a hydrogen fuel cell vehicle powertrain (HFCV), and/or any combination of these drive systems and components.

Further, the vehicle 105 may be a manually driven vehicle, and/or be configured to operate in a fully autonomous (e.g., driverless) mode (e.g., level-5 autonomy) or in one or more partial autonomy modes. It should be appreciated that embodiments of the present disclosure may assist vehicle operations using the BMI system in cases of manually operated vehicles or semi-autonomous features where a human driver performs some or most aspects of the vehicle operation.

Examples of partial autonomy modes are widely understood in the art as autonomy Levels 1 through 5. An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level 4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level 5 autonomy is associated with autonomous vehicle systems that require no human input for operation, and generally do not include human operational driving controls.

In some aspects, the mobile device 120 may communicate with the vehicle 105 through the one or more wireless channel(s) 130, which may be encrypted and established between the mobile device 120 and a Telematics Control Unit (TCU) 160. The mobile device 120 may communicate with the TCU 160 using a wireless transmitter associated with the TCU 160 on the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125, and also via direct communication with the vehicle 105.

The network(s) 125 illustrate an example of one possible communication infrastructure in which the connected devices may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the BMI system 107, in accordance with the disclosure. The automotive computer 145 may include one or more processor(s) 150 and a computer-readable memory 155. The automotive computer 145 may include, in one example, the one or more processor(s) 150, and the computer-readable memory 155.

The BMI device 108 may be disposed in communication with the VCU 165, and may be configured to provide (in conjunction with the VCU 165) system-level and device-level control of the vehicle 105. The VCU 165 may be disposed in communication with and/or be a part of the automotive computer 145, and may share a common power bus 178 with the automotive computer 145 and the BMI system 107. The BMI device 108 may further include one or more processor(s) 148, a memory 149 disposed in communication with the processor(s) 148, and a Human-Machine Interface (HMI) device 146 configured to interface with the user 140 by receiving motor cortex brain signals as the user operates the vehicle using the BMI device 108.

The one or more processor(s) 148 and/or 150 may be disposed in communication with one or more memory devices disposed in communication with the respective computing systems (e.g., with the memory 149, the memory 155 and/or one or more external databases not shown in FIG. 1). The processor(s) 148, 150 may utilize the memory(s) 149, 155 to store programs in code and/or to store data for performing aspects in accordance with the disclosure. The memory(s) 149 and 155 may be a non-transitory computer-readable memory storing a BMI decoder 144. The memory(s) 149 and 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCUs 165 can include any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the ECUs 117 may control aspects of the vehicle 105, and implement one or more instruction sets received from the application 135 operating on the mobile device 120, from one or more instruction sets received from the BMI device 108.

The TCU 160 may be configured to provide vehicle connectivity to wireless computing systems onboard and offboard the vehicle 105. The TCU 160 may include a Navigation/GPS receiver 188 and/or a Bluetooth® Low-Energy Module (BLEM) 195, Wi-Fi transceiver, Ultra-Wide Band (UWB) transceiver, and/or other control modules configurable for wireless communication between the vehicle 105 and other systems, computers, and modules. The TCU 160 may also provide communication and control access between ECUs 117 using a Controller Area Network (CAN) bus 180, by retrieving and sending data from the CAN bus 180, and coordinating the data between vehicle 105 systems, connected servers (e.g., the server(s) 170), and other vehicles (not shown in FIG. 1) operating as part of a vehicle fleet.

The BLEM 195 may establish wireless communication using Bluetooth® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The CAN bus 180 may be configured as a multi-master serial bus standard for connecting two ECUs as nodes using a message-based protocol that can be configured and/or programmed to allow the ECUs 117 to communicate with each other. The CAN bus 180 may be or include a high speed CAN (which may have bit speeds up to 1 Mb/s on CAN, 5 Mb/s on CAN Flexible Data Rate (CAN FD)), and can include a low speed or fault tolerant CAN (up to 125 Kbps), which may, in some configurations, use a linear bus configuration. In some aspects, the ECUs 117 may communicate with a host computer (e.g., the automotive computer 145, the BMI system 107, and/or the server(s) 170, etc.), and may also communicate with one another without the necessity of a host computer. The CAN bus 180 may connect the ECUs 117 with the automotive computer 145 such that the automotive computer 145 may retrieve information from, send information to, and otherwise interact with the ECUs 117 to perform steps described according to embodiments of the present disclosure. The CAN bus 180 may connect CAN bus nodes (e.g., the ECUs 117) to each other through a two-wire bus, which may be a twisted pair having a nominal characteristic impedance. The CAN bus 180 may also be accomplished using other communication protocol solutions, such as Media Oriented Systems Transport (MOST) or Ethernet. In other aspects, the CAN bus 180 may be a wireless intra-vehicle CAN bus.

The ECUs 117, when configured as nodes in the CAN bus 180, may each include a central processing unit, a CAN controller, and a transceiver (not shown in FIG. 1). In an example embodiment, the ECUs 117 may control aspects of vehicle operation and communication based on inputs from human drivers, an autonomous vehicle controller, the BMI system 107, and via wireless signal inputs received from other connected devices such as the mobile device 120, among others.

The VCU 165 may control various loads directly via the CAN bus 180 communication or implement such control in conjunction with the BCM 193. The ECUs 117 described with respect to the VCU 165 are provided for exemplary purposes only, and are not intended to be limiting or exclusive. Control and/or communication with other control modules not shown in FIG. 1 is possible, and such control is contemplated.

The BCM 193 generally includes integration of sensors, vehicle performance indicators, and variable reactors associated with vehicle systems, and may include processor-based power distribution circuitry that can supervise and control functions related to the car body such as lights, windows, security, door locks and access control, and various comfort controls. The central BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193.

The computing system architecture of the automotive computer 145, VCU 165, and/or the BMI system 107 may omit certain computing modules. It should be readily understood that the computing environment depicted in FIG. 1 is one example of a possible implementation according to the present disclosure, and thus, it should not to be considered limiting or exclusive.

Figure 2:
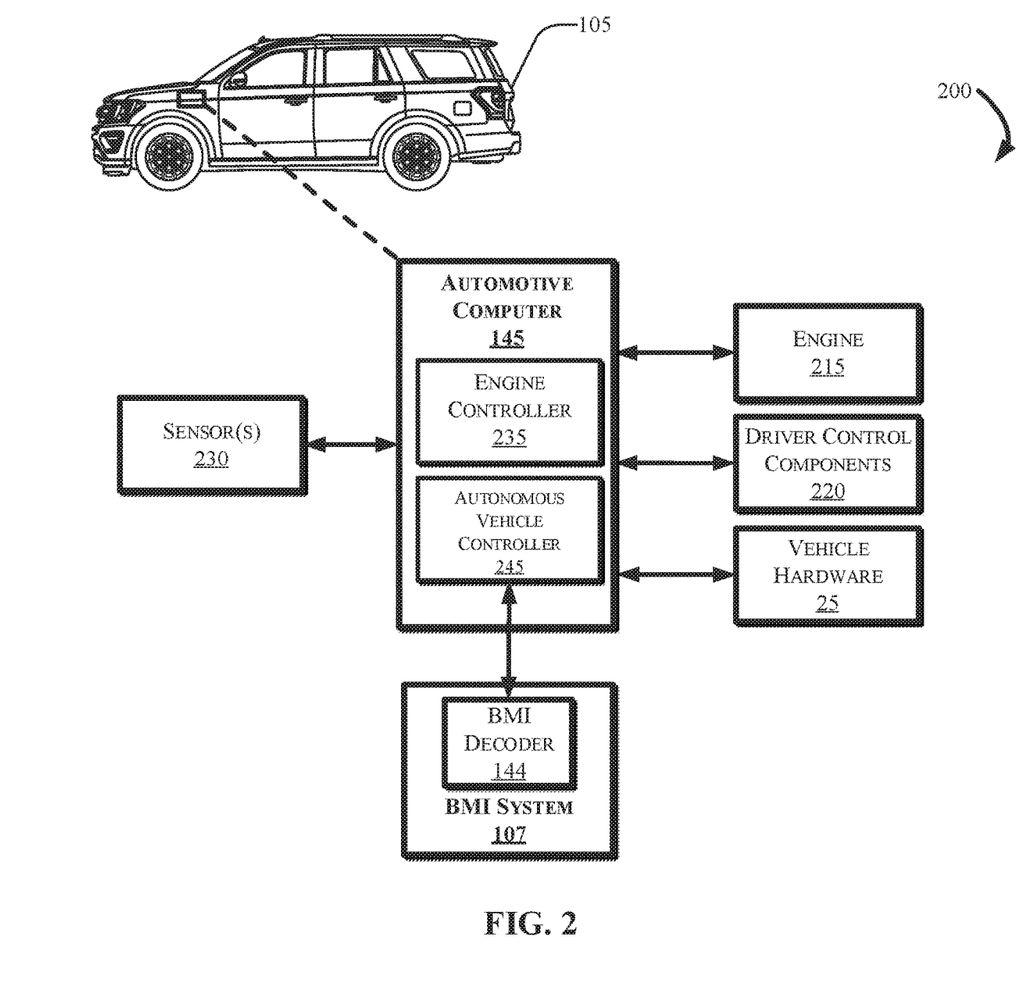
FIG. 2 illustrates a functional schematic of an example architecture of an automotive control system for use with the vehicle, in accordance with the present disclosure.

FIG. 2 illustrates a functional schematic of an example architecture of an automotive control system 200 that may be used for control of the vehicle 105, in accordance with the present disclosure. The control system 200 may include the BMI system 107, which may be disposed in communication with the automotive computer 145, and vehicle control hardware including, for example, an engine/motor 215, driver control components 220, vehicle hardware 225, sensor(s) 230, the mobile device 120, and other components not shown in FIG. 2.

The sensors 230 may include any number of devices configured or programmed to generate signals that help navigate the vehicle 105 that is operating in an autonomous mode. Examples of autonomous driving sensors 230 may include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like. The autonomous driving sensors 230 may help the AV 205 "see" the roadway and the vehicle surroundings and/or negotiate various obstacles while the vehicle is operating in the autonomous mode.

The VCU 165 may execute vehicle control functions as fuzzy state instruction sets. The VCU 165 may cause the engine controller 235 to issue commands to the control components 220, and/or the engine 215, where the commands may be configured to increase vehicle speed, decrease vehicle speed, execute vehicle turns, etc. Accordingly, the VCU 165 may associate control functions with increasing or decreasing states associated with the drive functions. For example, the VCU 165 may increment or decrement a fuzzy state based on the user intention, which may increase or decrease speed or turn radius, or a combination of the speed and turn radius, based on the incremented or decremented fuzzy state.

Interpreting neural data from the motor cortex of a user's brain is possible when the BMI device 108 is trained and tuned to a particular user's neural activity. The training procedures can include systematically mapping a continuous neural data feed obtained from that user, where the data feed provides quantitative values associated with user brain activity as the user provides manual input into a training computer system, and more particularly, as the user provides control of a pointer. The training computer system may form associations for patterns of neural cortex activity (e.g., a correlation model) as the user performs exercises associated with vehicle operation by controlling the pointer, and generating a correlation model that can process continuous data feed, identify neural cortex activity that is associated with control functions.

Accordingly, when configured with the trained BMI device that uses the trained correlation model, the VCU 165 may provide vehicle control by performing some aspects of vehicle operation autonomously, and provide other aspects of vehicle control to the user through the trained BMI system 107.

Figure 3:
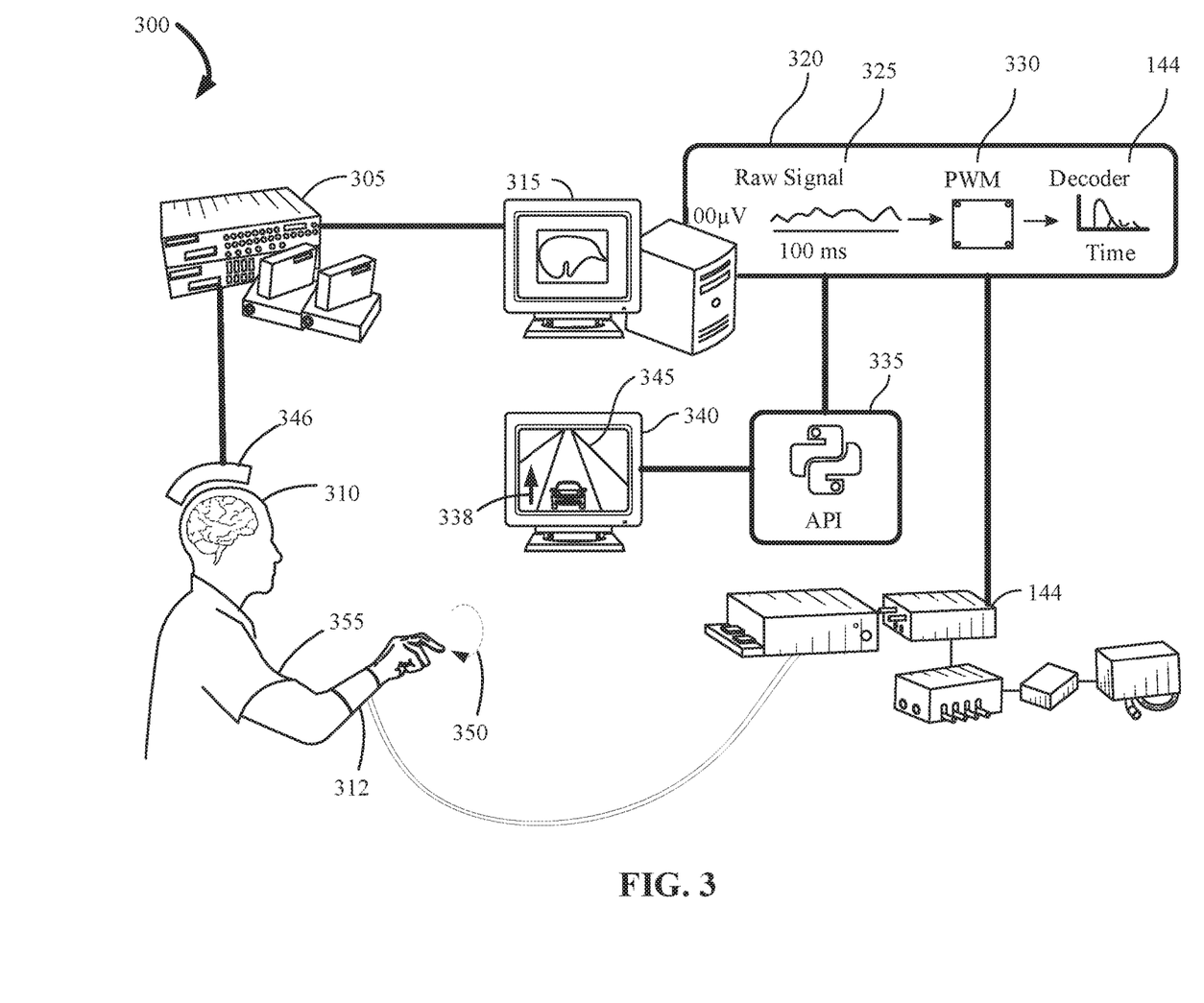
FIG. 3 illustrates an example BMI training system in accordance with an embodiment of the present disclosure.

FIG. 3 illustrates an example BMI training system 300, in accordance with an embodiment of the present disclosure. The BMI training system 300 may include a neural data acquisition system 305, a training computer 315 with digital signal processing (DSP) decoding, and an application programming interface (API) 335.

The neural data acquisition system 305 and the training computer 315 may be and/or include components from a conventional neural bridging system.

By way of a brief overview, the following paragraphs will provide a general description for an example method of training the BMI system 107 using the BMI training system 300. In one aspect, a user 310 may interact with a manual input device 312 and provide inputs to the BMI training system. The BMI training system 300 may generate a decoding model, based on the user inputs, for interpreting neural cortex brain activity associated with this particular user. For example, the BMI training system 300 may present a pointer 338 on a display device of a training computer 340. The user 310 may provide manual input using the manual input device 312, where the manual input includes moving the pointer 338 on the display device of the training computer 340. In one aspect, the user 310 may provide these manual control inputs while operating a driving simulation program 345. While the user 310 performs the manual inputs, the BMI training system 300 may also obtain the neural data using the neural data acquisition system 305. The BMI training system 300 may collect the neural data (e.g., raw data input) and perform a comparison procedure whereby the user 310 performs imagined movements 350 of an input arm 355 (where the imagined inputs can include a hand close, a hand open, a forearm pronation, and a forearm supination). Some embodiments may include performing the comparison procedure while the neural data acquisition system 305 obtains raw signal data from a continuous neural data feed indicative of brain activity of the user 310.

Obtaining the continuous neural data feed may include receiving, via the training computer 340, neural data input as a time series of decoder values from a microelectrode array 346. For example, the neural data acquisition system 305 may obtain the neural data by sampling the continuous data feed at a predetermined rate (e.g., 4 decoder values every 100 ms, 2 decoder values every 100 ms, 10 decoder values every 100 ms, etc.). The BMI training system 300 may generate a correlation model (not shown in FIG. 3) that correlates the continuous neural data feed to the fuzzy state associated with a first vehicle control function. The BMI training system may save the decoder values 325 to a computer memory 330, then convert the decoder values to motor cortex mapping data using pulse width modulation and other DSP techniques via a digital signal processor 320. The BMI decoder 144 may map data to aspects of vehicle control, such as, for example, velocity and steering control commands.

The microelectrode array 346 may be configured to receive the continuous neural data of neural cortex activity gathered from the user 310. The neural data may originate, for example, in response to cerebral cortex intracortical injection into intracortical noradrenergic fibers of the user's brain as the user 310 imagines a particular movement associated with vehicle control, and/or performs a manual movement that is meant to represent such control. In one example procedure, a movement imagined by the user may be mapped to increment a state to a next-contiguous state (e.g., from low speed to medium speed). In another aspect a movement imagined by the user may be mapped to decrement a state to a next-contiguous state (e.g., a reverse action from the increment operation). In another example, the user may imagine a movement for engaging the vehicle into particular states, or combinations of states (e.g., a low velocity during a slight right steering function).

The user 310 may be the same user as shown in FIG. 1, who may operate the vehicle with the trained BMI system 107, where the training procedure is specific to that particular user. In another aspect, the training procedure may provide a correlation model that correlates continuous neural data feed to fuzzy states associated with vehicle control functions, where the generalized correlation model applies a generalized neural cortex processing to a wider array of possible neural patterns. In this respect, the generalized model may be readily adopted by any user with some limited tuning and training. One method contemplated to produce a generalized model may include, for example, the use of machine learning techniques that include deep neural network correlation model development.

The microelectrode array 346 may be configured to obtain neural data from the primary motor cortex of a user 310 which data were acquired through an invasive or non-invasive neural cortex connection. For example, in one aspect, an invasive approach to neural data acquisition may include an implanted 96-channel intracortical microelectrode array configured to communicate through a port interface (e.g., a NeuroPort® interface, currently available through Blackrock Microsystems, Salt Lake, UT). In another example embodiment, using a non-invasive approach, the microelectrode array 346 may include a plurality of wireless receivers that wirelessly measure brain potential electrical fields using an electric field encephalography (EEG) device.

The training computer 315 may receive the continuous data feed via wireless or wired connection (e.g., using an Ethernet to PC connection) from the neural data acquisition system 305. The training computer 315 may be, in one example embodiment, a workstation running a MATLAB®-based signal processing and decoding algorithm. Other math processing and DSP input software are contemplated. The BMI training system may generate the correlation model that correlates the continuous neural data feed to the fuzzy states associated with the vehicle control functions (described in greater detail with respect to FIG. 4) using Support Vector Machine (SVM) Learning Algorithms (LIBSVM) to classify neural data into hand/forearm movements (supination, pronation, hand open, and hand closed).

The hand and forearm movements (hereafter collectively referred to as "hand movements 350") may be user-selected for their intuitiveness in representing vehicle driving controls (rightward turning, leftward turning, acceleration, deceleration, respectively). For example, the BMI training system may include an input program configured to prompt the user 310 to perform a gesture that represents turning right, and the BMI training system may record the manual input and neural cortex brain activity associated with the responsive user input. Decoded hand movements were displayed to the user as movements of a hand animation. In another aspect, the BMI training system may include a neuromuscular electrical stimulator system (not shown in FIG. 3) to obtain neural feedback of neural activity and provide the feedback to the user 310 based on the user's motor intent.

In some aspects, the BMI training system 300 may convert the neural data to a vehicle control command instruction associated with vehicle control functions. In one example embodiment, the BMI training system may match user intention to a fuzzy state associated with a user intention for a vehicle control action. Vehicle control actions may be, for example, steering functions that can include turning the vehicle a predetermined amount (which may be measured, for example, in degrees with respect to a forward direction position), or vehicle functions that can include changing a velocity of the vehicle.

The steering functions may be classifiable into tiers of turn radius, turn degree, or other characterizations associated with turning the vehicle 105. For example, a first tier may be a full "turn left" function indicating an approximate 90-degree turn having a particular turn radius. In another example, a second tier may be a "turn slight left" function, where the turn is approximately 30-45 degrees from a present trajectory at a particular turn radius. In a third example, a third tier may be "straight" function, which includes a command to maintain the present trajectory, having no turn radius. When each of the turn tiers (or turn angles, degrees, etc.) may be characterized as ranges of values, it should be appreciated that the ranges associated with each of the tiers may be "fuzzy" in that one state for a steering function (e.g., "slight right") may share some values associated with the degree of turning radius with respect to a present trajectory with a contiguous tier (e.g., "turn right"). In another example, changing the velocity may be categorized as speed tiers that have been organized as fuzzy states. In one aspect, a high-speed state, a medium-speed state, a low-speed state, a stop state, etc., may include ranges of values where some values are shared by more than one fuzzy state.

One exception to fuzzy states, including shared values with contiguous states, may be the stop state, which would (in most embodiments) include a single velocity (zero distance units of movement per time unit), and no overlapping values with any other contiguous states (e.g., low speed forward or low speed reverse).

A second exception to overlapping fuzzy state values may be the straight fuzzy state, which can include a single angle of turn with respect to a current trajectory (that is, zero degree of turn angle with respect to a current trajectory) and no overlapping values with any other contiguous state (e.g., "slight left" and "slight right"). Another possible configuration for a straight fuzzy state may include considering an average trailing trajectory, where the prior distance with respect to a set time unit is used to determine the relative "straight" position. Such a configuration may be useful when transitioning from a turn command to a straight command, where the straight trajectory may not provide sufficient information to steer the vehicle in a desired direction.

The fuzzy states described herein are provided as example states, and as such, may be expanded to include other defined parameters for respective states, additional vehicle control functions, etc.

Figure 4:
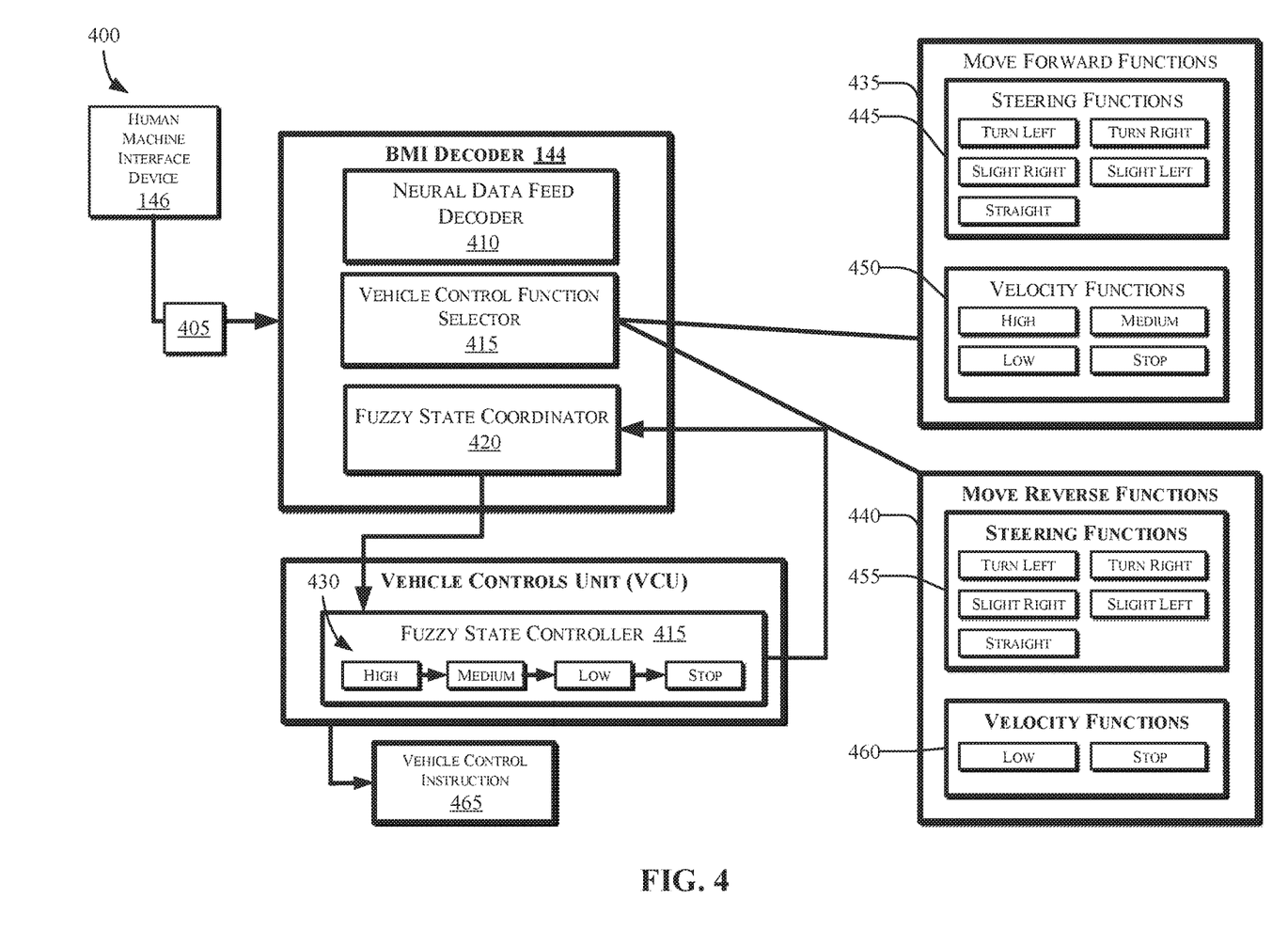
FIG. 4 depicts a functional block diagram of the BMI system 107 in accordance with an embodiment the present disclosure.

FIG. 4 depicts a functional block diagram of vehicle control using the BMI system 107, in accordance with the present disclosure. The BMI decoder 144 may receive the continuous neural data 405 from the Human Machine Interface (HMI) device 146. In an example scenario, a user (not shown in FIG. 4) may interface with the HMI device 146 and perform thought control steps consistent with the training procedures described with respect to FIG. 3. The BMI decoder 144 may receive the continuous neural data 405 feed, and decode the continuous neural data using a neural data feed decoder 410. The neural data feed decoder 410 can include the correlation model generated using the BMI training system 300 described with respect to FIG. 3.

In one aspect the neural data feed decoder 410 may decode the continuous neural data 405 to determine an intention of the user by matching pattern(s) in the continuous neural data 405 to patterns of the user's neural cortex activity observed during the training operation of FIG. 3. For example, the continuous neural data may be indicative of a move forward function of a plurality of move forward functions 435, or a move reverse function of a plurality of move reverse functions 440. In one aspect, the steering functions 445 may include various vehicle control tiers (and fuzzy states associated with the tiers) such as a turn left, turn right, slight right, slight left, and a straight fuzzy state. The move forward functions 435 may also include a plurality of fuzzy states associated with velocity functions such as a high, a medium, a low, and a stop fuzzy state. Moreover, the move reverse functions 440 may include steering functions 455 and velocity functions 460, which perform similar control aspects as the functions 445 and 450 but with a reverse direction. Other fuzzy states for vehicle control are possible, and thus, the move forward functions and the move reverse functions are not intended to be limiting, and are provided as examples only.

After matching the user intention received from the neural data feed decoder 410 to one or more fuzzy states associated with the vehicle control functions 435 and 440, the BMI system 107 may execute the vehicle control function based on the fuzzy state. This may include generating an instruction using the fuzzy state coordinator 420 to the VCU 165 that includes the intention of the user (e.g., move forward, straight at a medium velocity).

The VCU 165 may be configured to provide governance of fuzzy state control, such that rules are implemented that force selection of particular states and the speed of state incrementing and decrementing to comport with various guidelines. For example, it may not be advantageous to exceed particular speed limits in certain geographic locations, at certain times of day, etc. Accordingly, the VCU 165 may receive the fuzzy state(s) associated with the user intention and govern whether that requested state may be incremented or decremented based on the user intention. The VCU 165 may control the incrementing and decrementing 430, and make the governance decision based on geographic information received from a vehicle GPS, time information, date information, a dataset of rules associated with geographic information, time information, date information, etc. Other inputs are possible and are contemplated. Responsive to determining that a particular intention for a state change is impermissible, the fuzzy state coordinator 420 may maintain a current state or perform other autonomous vehicle control according to environmental and other factors associated with a trip.

Maintaining a particular state may include storing a command state register in memory, and maintaining the value stored in the state register until the VCU 165 breaks the command due to vehicle control conditions from independent control of the vehicle, or until an allowable user intention causes the stored state value to be replaced with an updated value. For example, the fuzzy state coordinator 420 may send a second vehicle control function instruction to the VCU 165, and update the command state register with the second vehicle control function instruction responsive to a determination (by the VCU 165) that the second vehicle control function instruction comports with present driving conditions.

Responsive to determining that the increment or decrement intention, and/or the function selection intention of one or more of the move forward functions 435 and move reverse functions 440, the fuzzy state coordinator 420 may generate a vehicle control instruction 465. The VCU 165 may cause the vehicle to act in accordance with the control instruction by executing the control algorithm associated with a function.

Figure 5:
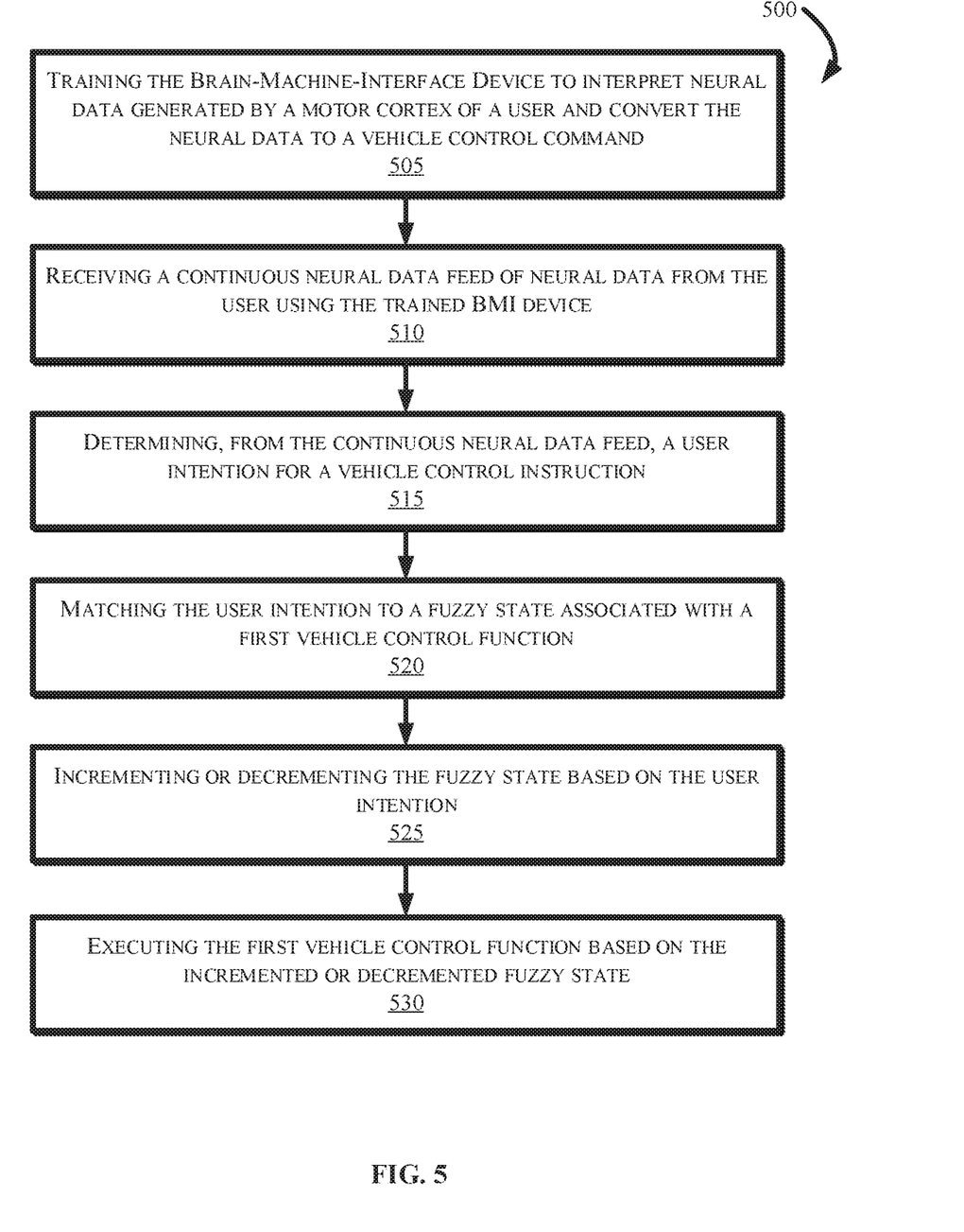
FIG. 5 depicts a flow diagram in accordance with the present disclosure.

FIG. 5 is a flow diagram of an example method 500 for controlling a vehicle using the BMI system 107, according to the present disclosure. FIG. 5 may be described with continued reference to prior figures, including FIGS. 1-4. The following process is exemplary and not confined to the steps described hereafter. Moreover, alternative embodiments may include more or less steps than are shown or described herein, and may include these steps in a different order than the order described in the following example embodiments.

Referring first to FIG. 5, at step 505, the method 500 may commence with training the BMI device to interpret neural data generated by a motor cortex of a user's brain and convert the neural data to a vehicle control command instruction.

Next, the method includes a step 510 of receiving a continuous neural data feed of neural data from the user using the trained BMI device.

At step 515, the method 500 may further include determining, from the continuous neural data feed, a user intention for a vehicle control command instruction. In one aspect, the fuzzy state may be associated with a first set of Gaussian kernel type membership functions. The first set of Gaussian kernel type membership functions may include a control command instruction for steering the vehicle.

At step 520, the method includes matching the user intention to a fuzzy state associated with a first vehicle control command function. In one aspect, control functions may be characterized by direction (e.g., the move forward functions 435 and the move reverse functions 440 as depicted in FIG. 4). In another aspect, the functions may be characterized according to vehicle control type (e.g., the steering functions 445 and the velocity functions 450). The fuzzy states associated with the command control functions may include vehicle control aspects such as a command for steering the vehicle that includes an instruction for executing vehicle steering during forward motion, and an instruction for executing vehicle steering during reverse motion. In other aspects, the fuzzy state may be associated with a second set of Gaussian kernel type membership functions that include a control command instruction for vehicle throttle and brake. Other commands are possible and contemplated.

At step 525, the method may include incrementing or decrementing the fuzzy state based on the user intention. Incrementing and decrementing may include causing one fuzzy state to move from a first state to a contiguous fuzzy state.

At step 530, the method may include executing the first vehicle control function command based on the incremented or decremented fuzzy state. In an example embodiment, executing the first vehicle control command function based on the incremented or decremented fuzzy state can include sending the first vehicle control function command instruction to a vehicle Telematics Control Unit (TCU), and updating a command state register associated with the TCU with the first vehicle control command function. The command state register may be, for example, a computer-readable memory storing fuzzy state values. Executing the vehicle control command function may further include controlling the electronic control module (ECM) based on the first vehicle control function in the command state register. Accordingly, a prior state stored in the state register may be maintained until the AV controller replaces the value, or the value is replaced by the fuzzy state coordinator with a user intention fuzzy state command approved by the AV controller according to autonomous vehicle driving rules associated with the AV control of the vehicle that is independent of the BMI interface functionality.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A computer-implemented method for controlling a vehicle using a brain machine interface (BMI) device, comprising:
    training the BMI device to interpret neural data generated by a motor cortex of a user and convert the neural data to one or more vehicle control commands;
    receiving a continuous neural data feed of the neural data from the user using the trained BMI device;
    determining, from the continuous neural data feed, a user intention for a first vehicle control command function;
    matching the user intention to a fuzzy state associated with the first vehicle control command function; and
    executing the first vehicle control command function based on the fuzzy state.

2. The computer-implemented method according to claim 1, wherein the training comprises:
    presenting a pointer on a display device of a training computer;
    receiving the continuous neural data feed, wherein the continuous neural data feed is indicative of brain activity as the user provides one or more manual inputs using an input device that moves the pointer on the display device; and
    generating a correlation model that correlates the continuous neural data feed to the fuzzy state associated with the first vehicle control command function.

3. The computer-implemented method according to claim 1, wherein the fuzzy state is associated with a first set of Gaussian kernel type membership functions, the first set of Gaussian kernel type membership functions comprising a control command for steering the vehicle.

4. The computer-implemented method according to claim 3, wherein the control command for steering the vehicle comprises an instruction for executing vehicle steering during forward motion, and an instruction for executing vehicle steering during reverse motion.

5. The computer-implemented method according to claim 1, wherein the fuzzy state is associated with a second set of Gaussian kernel type membership functions comprising a control command for a vehicle throttle and brake.

6. The computer-implemented method according to claim 5, wherein the control command for the vehicle throttle and brake comprises an instruction for executing forward motion, and an instruction for executing reverse motion.

7. The computer-implemented method according to claim 1, wherein the first vehicle control command function comprises at least one of a directional function, a steering function, and a velocity function, and wherein executing the first vehicle control command function based on the fuzzy state comprises:
sending the first vehicle control command function to an autonomous vehicle (AV) controller;
updating a command state register with the first vehicle control command function; and
controlling an electronic control unit (ECU) based on the first vehicle control command function in the command state register.

8. The computer-implemented method according to claim 7, wherein executing the first vehicle control command function based on the fuzzy state further comprises:
sending a second vehicle control command function to the AV controller;
updating the command state register with the second vehicle control command function; and
controlling the ECU based on the second vehicle control command function in the command state register.

9. The computer-implemented method according to claim 1, wherein an autonomous mode controller increments or decrements the fuzzy state.

10. A brain machine interface (BMI) device system for controlling a vehicle, comprising:
a processor; and
a memory for storing executable instructions, the processor configured to execute the instructions to:
receive, via the BMI device, a continuous neural data feed of neural data from a user;
determine, from the continuous data feed, a user intention for a first vehicle control command function;
match the user intention to a fuzzy state associated with the first vehicle control command function; and
execute the first vehicle control command function based on the fuzzy state.

11. The BMI system according to claim 10, further comprising an autonomous vehicle controller disposed in communication with the processor, wherein the autonomous vehicle controller is configured to execute the instructions to:
increment or decrement the fuzzy state based on the user intention.

12. The BMI system according to claim 10, wherein the fuzzy state is associated with a first set of Gaussian kernel type membership functions, the first set of Gaussian kernel type membership functions comprising a control command for steering the vehicle.

13. The BMI system according to claim 12, wherein the control command for steering the vehicle comprises an instruction for executing forward motion, and an instruction for executing reverse motion.

14. The BMI system according to claim 10, wherein the fuzzy state is associated with a second set of Gaussian kernel type membership functions comprising a control command for vehicle throttle and brake.

15. The BMI system according to claim 10, wherein the first vehicle control command function comprises at least one of a directional function, a steering function, and a velocity function, and wherein the processor is further configured to execute the instructions to:
send the first vehicle control command function to an autonomous vehicle (AV) controller;
update a command state register associated with the AV controller with the first vehicle control command function; and
control an electronic control unit (ECU) based on the first vehicle control command function in the command state register.

16. The BMI system according to claim 15, wherein the processor is further configured to execute the instructions to:
send a second vehicle control command function to the AV controller;
update the command state register with the second vehicle control command function; and
control the ECU based on the second vehicle control command function in the command state register.

17. A non-transitory computer-readable storage medium in a brain machine interface (BMI) device, the computer-readable storage medium having instructions stored thereupon which, when executed by a processor, cause the processor to:
receive, via the BMI device, a continuous neural data feed of neural data from a user;
determine, from the continuous data feed, a user intention for a first vehicle control command function;
match the user intention to a fuzzy state associated with the first vehicle control command function; and
execute the first vehicle control command function based on the fuzzy state.

18. The non-transitory computer-readable storage medium according to claim 17, having further instructions stored thereupon to:
send the first vehicle control command function to an autonomous vehicle (AV) controller;
update a command state register associated with the AV controller with the first vehicle control command function; and
control an electronic control unit (ECU) based on the first vehicle control command function in the command state register,
wherein the first vehicle control command function comprises at least one of a directional function, a steering function, and a velocity function.

19. The non-transitory computer-readable storage medium according to claim 18, having further instructions stored thereupon to:
send a second vehicle control command function to the AV controller;
update the command state register with the second vehicle control command function; and
control the ECU based on the second vehicle control command function in the command state register.

20. The non-transitory computer-readable storage medium according to claim 17, having further instructions stored thereupon to:
increment or decrement the fuzzy state with an autonomous mode controller.

* * * * *